United States Patent

Miyazawa

Patent Number: 5,230,092
Date of Patent: Jul. 20, 1993

[54] READ/WRITE DEVICE AND APPARATUS AND METHOD FOR READING FROM AND WRITING INTO THE DEVICE

[75] Inventor: Atsushi Miyazawa, Suwa, Japan

[73] Assignee: Seiko Epson Corporation, Tokyo, Japan

[21] Appl. No.: 554,779

[22] Filed: Jul. 20, 1990

[30] Foreign Application Priority Data

Jul. 21, 1989 [JP] Japan ................................. 1-189379
Oct. 4, 1989 [JP] Japan ................................. 1-117036
May 24, 1990 [JP] Japan ................................. 2-134653

[51] Int. Cl.⁵ .......................................... H04B 1/40
[52] U.S. Cl. .................... 455/89; 455/186.1; 455/343
[58] Field of Search ............ 455/89, 90, 127, 343, 455/347–349, 186, 186.1

[56] References Cited

U.S. PATENT DOCUMENTS

| | | |
|---|---|---|
| 4,225,819 | 9/1980 | Grau et al. |
| 4,792,986 | 12/1988 | Garner et al. ................ 455/89 |
| 4,903,330 | 2/1990 | Ishiguro et al. ................ 455/343 |

FOREIGN PATENT DOCUMENTS

| | | |
|---|---|---|
| 0276403 | 8/1988 | European Pat. Off. |
| 0298720 | 1/1989 | European Pat. Off. |
| 63556 | 4/1984 | Japan |
| 54825 | 3/1989 | Japan |
| 129626 | 5/1989 | Japan |
| 17022989 | 7/1989 | Japan |
| 2000381 | 1/1979 | United Kingdom |

Primary Examiner—Reinhard J. Eisenzopf
Assistant Examiner—Edward Urban
Attorney, Agent, or Firm—Blum Kaplan

[57] ABSTRACT

A device such as a receiver, transmitter and/or transceiver includes a battery casing and at least one circuit substrate having a plurality of terminals arranged to lie in a plane. The battery casing has an opening which extends in a plane substantially parallel to the plane of the circuit substrate terminals. A plurality of apertures at the bottom of the battery casing correspond in number and are positioned directly above the circuit substrate terminals. Information such as, but not limited to, an identification code can be written into the device by removing a battery casing cover and inserting a plurality of read/write terminals through the opening and apertures of the battery casing so as to engage the circuit substrate terminals. In reading or writing information into the device by an apparatus, an arm of the apparatus which includes the plurality of read/write terminals is rotatably swung upwardly to provide room for the device to be positioned on a table of the apparatus. The table includes two guide walls which extend substantially orthogonally to each other and lie in the same plane. In positioning the device on the table, a pair of side walls of the device are placed against the guide walls of the apparatus. The arm of the apparatus is then rotated toward the device to permit the read/write terminals of the apparatus to be inserted through the opening and apertures of the battery casing for contact with the circuit substrate terminals.

73 Claims, 11 Drawing Sheets

READ/WRITE DEVICE AND APPARATUS AND METHOD FOR READING FROM AND WRITING INTO THE DEVICE

BACKGROUND OF THE INVENTION

This invention relates to a radio receiver, radio transmitter and radio transceiver, and more particularly to a read/write device and apparatus and method for reading information from and writing information into such a device wherein the information includes, but is not limited to, identification codes.

Figure 13:
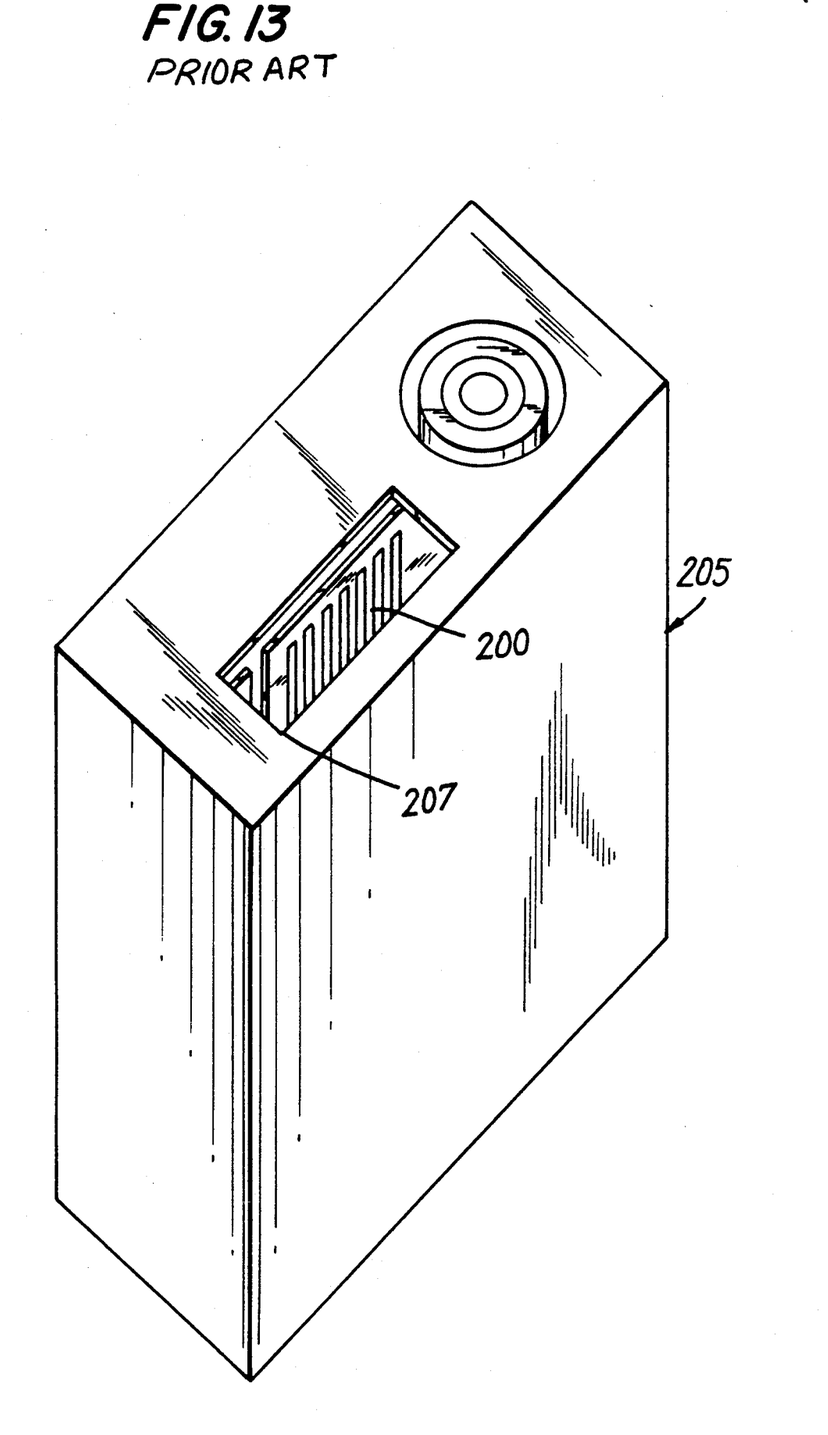
FIG. 13 is a perspective view of a conventional portable, selectively callable radio receiver.

As shown in FIG. 13, a conventional read/write device 205 includes a plurality of read/write terminals 200. Device 205 also includes an opening 207. The plurality of read/write terminals 200 are accessible through opening 207 when a battery cover (not shown) is removed. The plurality of read/write terminals 200 are arranged substantially orthogonally to opening 207.

Figure 14:
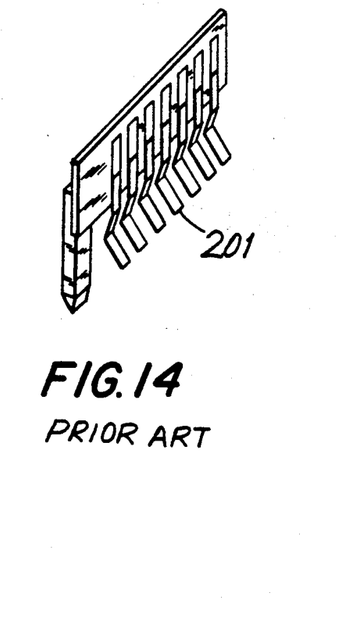
FIG. 14 is a perspective view of a plurality of read/write terminals included within a conventional read/write apparatus.
Figure 15:
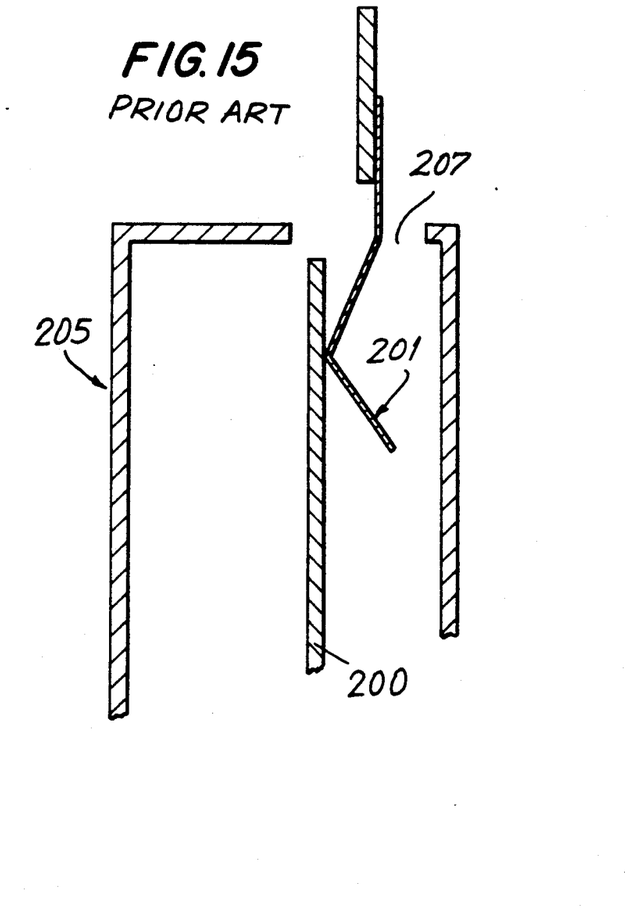
FIG. 15 is a fragmentary sectional view of the read/write terminals of FIG. 14 inserted within the read/write device of FIG. 13.

As shown in FIG. 14, an apparatus for reading into and writing from a read/write device includes a plurality of read/write terminals 201 in the form of leaf springs. As shown in FIG. 15, in reading from and writing into read/write device 205, read/write terminals 201 are inserted through opening 207 of device 205 so as to slidably engage corresponding individual terminals 200. Terminals 201 must be pushed through opening 207 so as to travel in a direction substantially orthogonal to the direction in which terminals 201 contact terminals 200.

Figure 16:
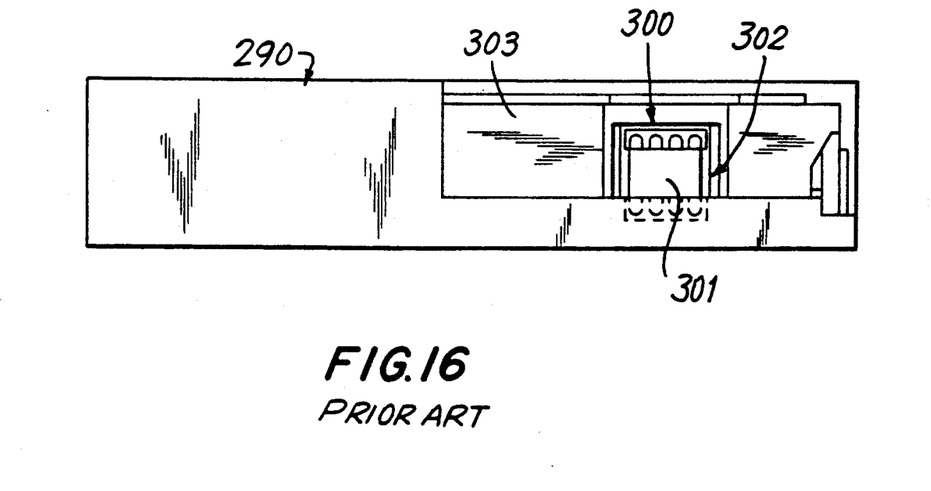
FIG. 16 is another conventional portable, selectively-callable radio receiver.

Shown in FIG. 16 is another conventional read/write device 290 which includes an opening 300 and a programmable read only memory (PROM) 301. Opening 300 is formed in a battery casing 303 and PROM 301 is connected through a socket and an auxiliary substrate 302 to a main substrate (not shown).

Figure 17:
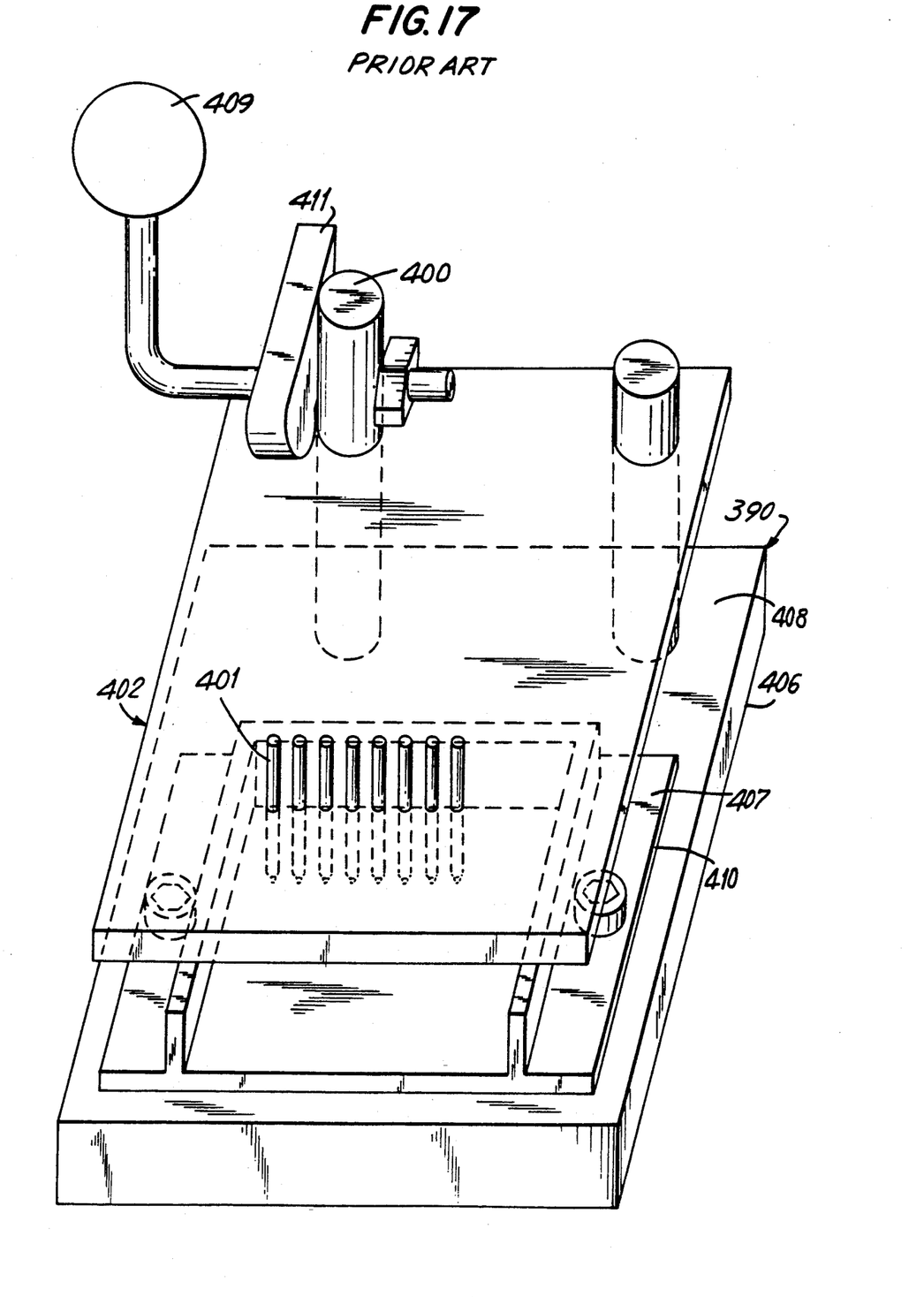
FIG. 17 is a perspective view of a conventional read/write apparatus.

As shown in FIG. 17, a conventional read/write apparatus 390 for reading into and writing from a conventional read/write device includes a slide guide 400 which rises in a substantially vertical direction from a face 408 of a base 406. Apparatus 390 also includes a stage 402 having read/write terminals 401. Stage 402 is operable for moving up and down vertically with respect to a face 407 of a table 410 by controlling the position of a handle 409 coupled to a cam assembly 411.

Since the plurality of terminals 200 of device 205 are arranged substantially orthogonal to opening 207, which are accessible upon removal of a battery casing cover, a plurality of guide slits formed in a circuit substrate of device 205 in the vicinity of terminals 200 are required to permit read/write terminals 201 to be placed next to read/write terminals 200 for engagement therewith. Additional spacing within device 205 is required for these guide slits. To accommodate such spacing, the package density (i.e. the number of elements within a given area) of the circuit substrate of device 205 must be maintained at a relatively low level.

Dust and other foreign substances can enter opening 207 during reading and writing operations, detrimentally affecting the operation of device 205. Since device 205 must include guide slits, the elements within device 205 must be spread out. Therefore, the overall package density of device 205 is also lowered. Where the thickness of the housing enclosing a device such as a receiver is limited, insufficient spacing therein to permit access of terminals 200 by terminals 201 can result.

Typically, when read/write terminals 201 are made in the form of leaf springs, terminals 201 are made from materials which are not very rigid (i.e. do not have a high material strength) to accommodate the narrow spacing within device 205 and to ensure successful contact with terminals 200. Consequently, terminals 201 must be handled with great care. The speed at which terminals 201 are inserted into device 205 must be reduced (i.e., at a lower efficiency). The durability of terminals 201 is also relatively low. Conventional read/write devices, such as device 290, which use a PROM having a predetermined size or thickness and which are not rewritable require use of a socket to accommodate the PROM making the PROM difficult to handle.

Conventional read/write apparatuses, such as apparatus 390, for reading from and writing into a device (not shown) require that stage 402, which includes read/write terminals 401, be mounted on apparatus 390 to permit vertical movement with respect to table face 407. Base 406 and slide guides 400 of apparatus 390 should also be fixed (i.e., rigid) relative to stage 402. Based on such operating requirements, apparatus 390 is relatively large in size, relatively heavy in weight, includes parts which are difficult to machine and otherwise manufacture and has a relatively high cost.

It is therefore desirable to provide a read/write device and apparatus and method for reading from and writing into the device so that the package density of the circuit substrate and overall packaging density of the read/write device is relatively high. The design of the read/write device should prevent dust and other foreign particles from entering the device. The read/write apparatus for reading and writing information such as, but not limited to, identification codes, should not require a high level of care to operate and should have read/write terminals of relatively high durability. The read/write apparatus also should be relatively small in size, light in weight and have a relatively low manufacturing cost.

SUMMARY OF THE INVENTION

Generally speaking, in accordance with the invention, a device such as a receiver, transmitter or transceiver is enclosed within a housing and includes a circuit substrate having a plurality of terminals. The housing has an opening which lies in a plane which is substantially parallel to the plane formed by the terminals of the circuit substrate. Access to the opening is provided by removing a protective covering from the housing of the device. Since the opening is substantially parallel rather than perpendicular to the circuit substrate terminals, there is no need for guide slits within the device to accommodate the read/write terminals of the apparatus. The package density of the circuit substrate and the overall device can be increased.

The opening within the device serves as an opening for a battery casing. At the bottom of the battery casing are a plurality of apertures corresponding to and directly above the terminals of the circuit substrate. The plurality of apertures are dimensioned to have a smaller diameter and are sufficiently spaced from the terminals of the circuit substrate to prevent dust and other foreign substances, including a user's fingers from coming into contact with the terminals of the circuit substrate. Access to the terminals of the circuit substrate for reading information from or writing information into the device is possible only when the battery is removed from the battery casing.

The information which is read from or written into the device includes an identification code. Generally, the identification code must be included within a signal received by the device to operate the device.

In another aspect of the invention, an apparatus for writing information into and reading information from a device includes a base for receiving and supporting the device. The device is enclosed within a housing having a pair of side walls. The device is easily and simply mounted onto the apparatus by placing the sidewalls of the device against a pair of guide walls of the apparatus. Consequently, a high degree of accuracy in mounting the device onto the apparatus is not required. The apparatus also includes a plurality of read/write terminals which correspond in number to the number of terminals of the circuit substrate. Since the opening within the device lies in a plane which is substantially parallel to the plane formed by the terminals of the circuit substrate, the read/write terminals of the apparatus need not be in the form of leaf springs to ensure contact is made between the read/write terminals of the apparatus and the terminals of the circuit substrate of the device. The read/write terminals of the apparatus can have a high material strength and therefore are far more durable than comparable read/write terminals of a conventional apparatus.

The apparatus also includes a rotatable arm, the read/write terminals of the apparatus being connected to one end of the arm. Consequently, the read/write terminals of the apparatus can be moved towards and away from the base.

In reading information from and writing information into a device, the arm is first moved away from the base of the apparatus. The device is then positioned on a table of the apparatus by placing the side walls of the apparatus against the guide walls of the apparatus. The guide walls are substantially orthogonal to each other and can be integrally formed on the table. The arm of the apparatus is then moved toward the table whereby the read/write terminals of the apparatus pass through the opening of the battery casing and the apertures at the bottom of the battery casing so as to engage the terminals of the circuit substrate of the device.

Accordingly, it is an object of the invention to provide an improved read/write device which has a circuit substrate with a relatively high density of elements resulting in a reduction in the overall size of the device.

It is another object of the invention to provide an improved apparatus for reading from and writing into a read/write device which does not require a high level of care, can be operated at a relatively high speed and includes read/writes terminals of high durability.

It is a further object of the invention to provide a read/write apparatus for reading into and writing from a read/write device which is relatively small in size, relatively low in weight and has a relatively low manufacturing cost compared to a conventional read/write apparatus.

Still other objects and advantages of the invention will, in part, be obvious and will, in part, be apparent from the specification.

The invention accordingly comprises several steps in a relation of one or more such steps with respect to each of the others, and the apparatus embodying features of construction, a combination of elements and arrangements of parts which are adapted to effect such steps, all as exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
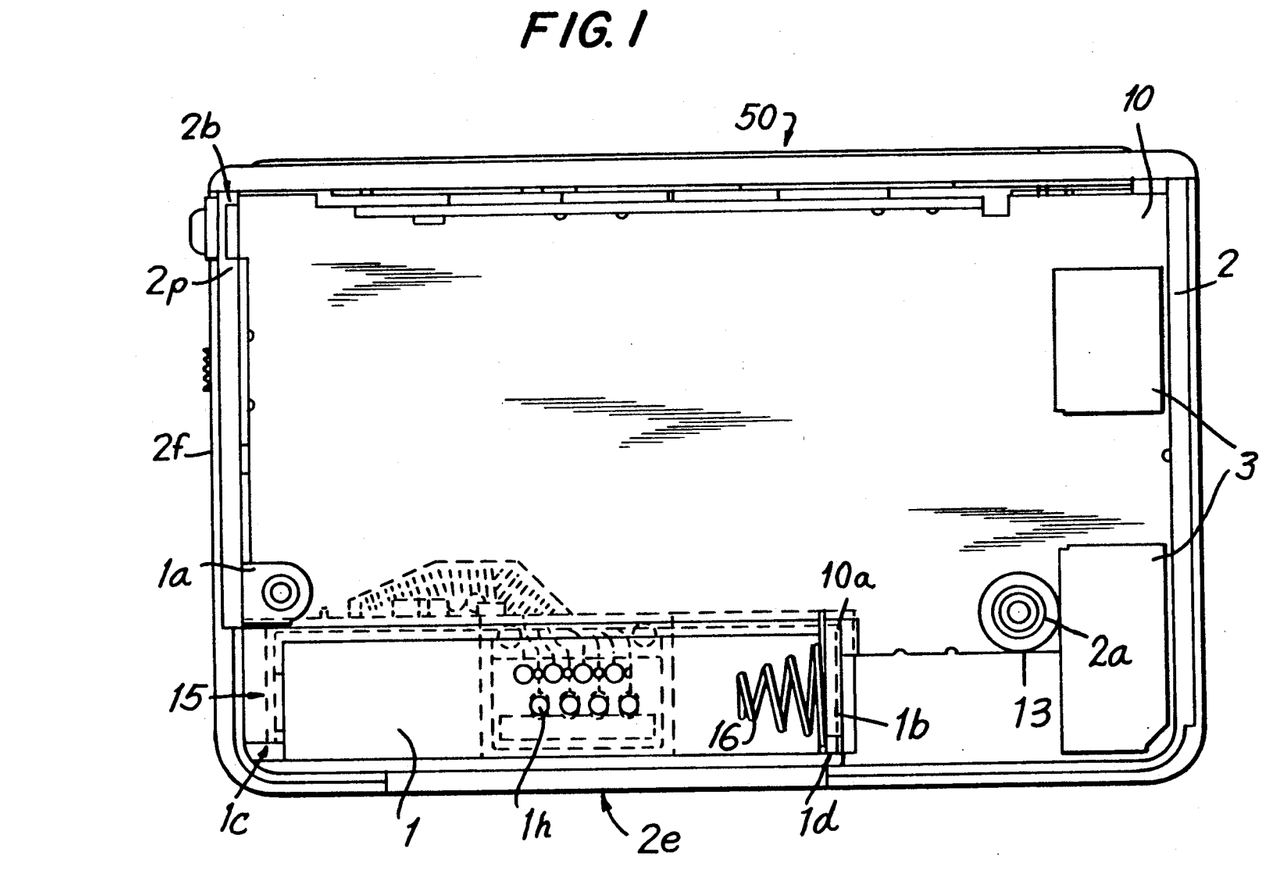
FIG. 1 is a plan view of an identification code read/write device in accordance with one embodiment of the invention.

Shown in FIG. 1 is a read/write device such as, but not limited to, a portable radio receiver 50 with a battery cover, rear casing cover and fixing screws for the cover removed. Receiver 50 is of the selectively-callable type, that is, a receiver which selectively receives transmitted information based on a predetermined identification code. Receiver 50 includes a battery casing 1 positioned, as shown in FIG. 1, at the bottom left corner of a front casing cover 2 and an antenna 3 positioned along the right edge of front casing cover 2. A circuit substrate 10 extends in a plane substantially parallel to front casing cover 2 and is supported by a guide protrusion 2a and a guide groove 2b. Guide protrusion 2a is formed integrally with front casing cover 2 and guide groove 2b is formed in a left wall 2p of front casing cover 2.

A spacer 13, which is supported by guide protrusion 2a, maintains a predetermined gap between circuit substrate 10 and a rear casing cover (not shown). An additional spacer 1a is integrally formed with battery casing 1. Receiver 50 also includes a battery plus (+) terminal 15 and a battery minus (−) terminal 16.

Battery casing 1 includes a plurality of slits 1b formed in the back face and adjacent side faces of battery casing 1. Slits 1b are guided in two directions of a plane (i.e., directions of slits 1b along the back face and adjacent side face) through engagement with a peripheral notch portion 10a of circuit substrate 10 (as also shown in FIG. 2).

Battery casing 1 also includes an integrally formed battery plus (+) terminal guide 1c and a battery minus (−) terminal guide 1d for guiding battery plus (+) terminal 15 and battery minus (−) terminal 16, respectively. Battery casing 1 is effectively supported relative to circuit substrate 10 through the connection of battery plus (+) terminal guide 1c and battery minus (−) terminal guide 1d to battery plus (+) terminal 15 and battery minus (−) terminal 16. Battery casing 1 is secured to circuit substrate 10 by rear casing cover fixing screws (not shown), at least one of which engages with spacer 1a.

Figure 2:
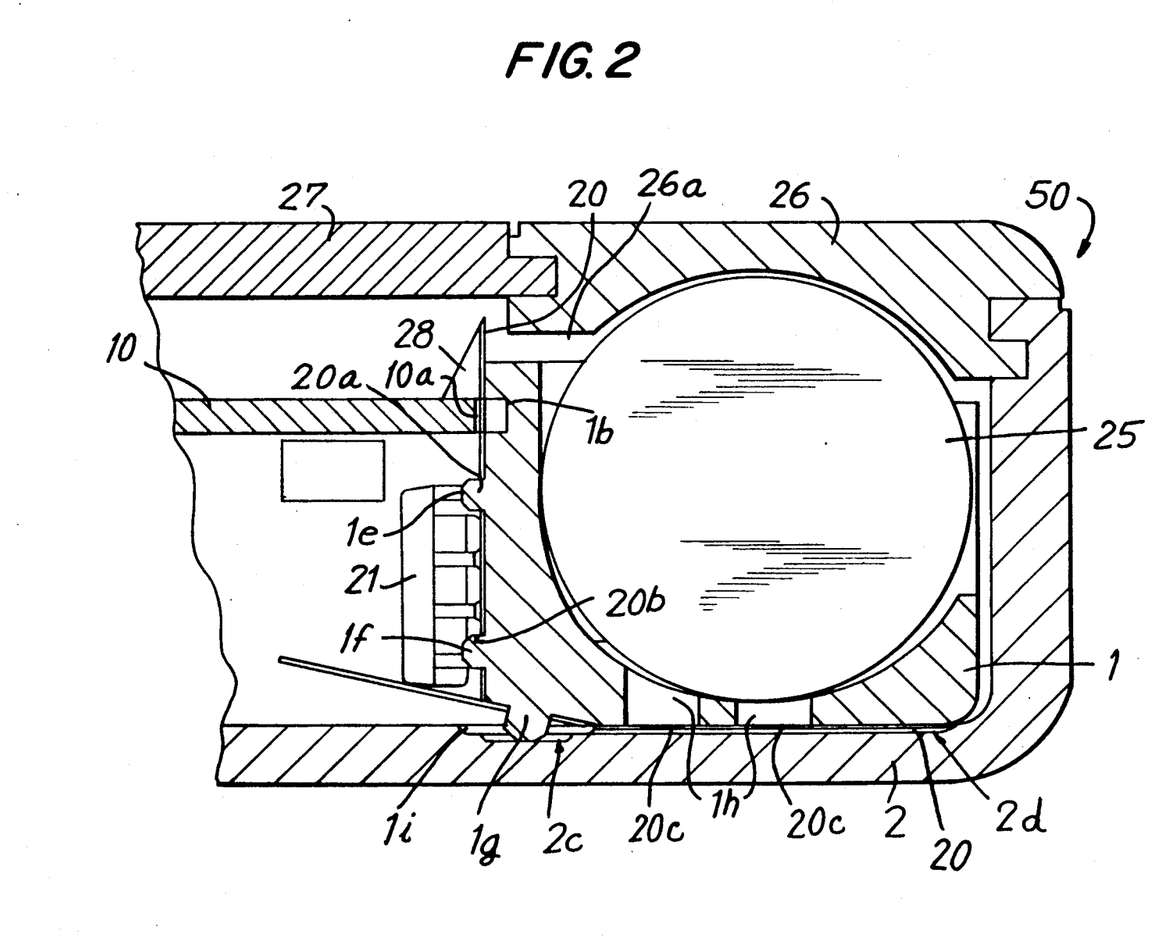
FIG. 2 is a fragmentary sectional view including the battery casing of the device shown in FIG. 1.

FIG. 2 is a fragmentary sectional view of device 50 which includes battery casing 1. An additional flexible circuit substrate 20 is positioned on the exterior surface of battery casing 1. A storage element (i.e. memory device) 21 for storing the receiver identification code is positioned on circuit 20 between circuit substrate 10 and front casing cover 2. The identification code can be written into the storage element 21. Preferably, an electrically erasable programmable read only memory (EEPROM) of the 8-terminal dual in-line package (DIP) type is used for storage element 21. It is to be understood that storage element 21 need not be an 8-terminal DIP type and can be mounted to circuit substrate 20 using any well known technique.

A pair of protrusions 1e and 1f, which are formed on the back face of battery casing 1, guide circuit substrate 20 by extending through a pair of holes 20a and 20b in circuit substrate 20, respectively. A protrusion 1g, which is formed at the lower edge of battery casing 1, serves to position a bottom portion of battery casing 1 or circuit substrate 20. A plurality of holes 1h such as, but not limited to eight, are formed in the bottom portion of battery casing 1. Holes 1h are arranged in a zigzag fashion to permit packaging of a high density of write terminals. A reduction in the size of both device 50 and, as explained below, an apparatus for reading into or writing from device 50 results. Device 50 also includes a battery 25 seated in battery casing 1, a battery cover 26 covering battery 25 and a rear casing 27.

A plurality of terminals 20c on circuit substrate 20 are positioned directly below and correspond to the plurality of holes 1h so as to permit access to storage element 21 for reading from and writing into the latter. Terminals 20c are gold plated to provide minimal resistance and a high level of conductivity for information travelling to and from storage element 21 through terminals 20c.

Holes 1h have a relatively small diameter to prevent the fingers of a user when inserting or removing battery 20 from battery casing 1 from touching one or more terminals 20c. Accordingly, short circuiting or the like of circuitry including storage element 21 is prevented. The read/write operation of storage element 21 cannot be performed unless battery 25 is removed from battery casing 1. Therefore, during a read/write operation charging of battery 25 can be prevented. One or more soldering portions 28 are positioned between circuit substrate 20 and circuit substrate 10 and define individual islands providing electrical connections therebetween.

Circuit substrate 10 is arranged substantially orthogonal to the back face of battery casing 1. Peripheral notches 10a are spaced slightly apart from circuit substrate 20. Holes 1h, which are formed in the bottom portion of battery casing 1, are centrally located between battery plus (+) terminal 15 and battery minus (−) terminal 16 as shown in FIG. 1.

Circuit substrate 20 is bonded and secured in the vicinity of protrusion 1g to battery casing 1. Protrusion 1g is provided at the lower edge of battery casing 1. Circuit substrate 20 is also bonded and secured in the vicinity of holes 1h.

Protrusion 1g extends through a flat recess or chamfer portion 1i. Recess 1i is formed in the lower back face of battery casing 1 and in combination with a corresponding flat relief recess 2c formed in front casing cover 2 prevents having to increase the thickness of receiver 50 in order to accommodate protrusion 1g.

A flat recess 2d formed in front casing cover 2 serves as a relief for circuit substrate 20. As illustrated in FIG. 2, substrate 20 can be arranged with all elements on one side of the substrate (i.e., a single sided substrate) which reduces the manufacturing cost of device 50.

Figure 3:
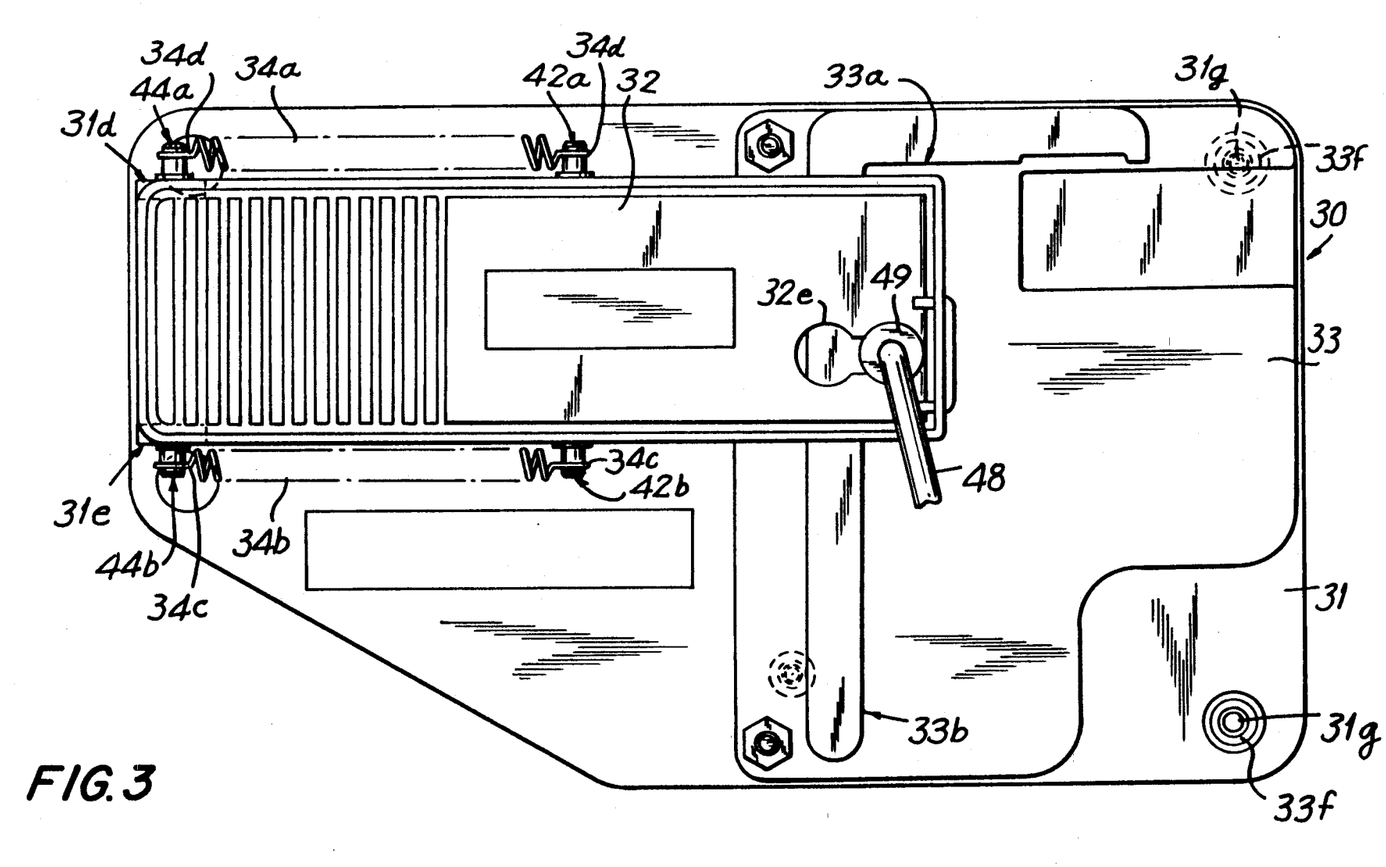
FIG. 3 is a plan view of an identification code read/write apparatus in accordance with the invention.

As shown in FIG. 3, an apparatus 30 for reading from and writing into receiver 50 includes a base 31, an arm 32 and a pallet 33 serving as a table. Pallet 33 includes a pair of walls 33a and 33b extending upwardly from pallet 33 in directions which are substantially orthogonal to each other. Walls 33a and 33b serve to guide a pair of sides 2f and 2e of front casing cover (i.e., outer casing) 2. More particularly, walls 33a and 33b serve to guide and properly position device 50 when placed on pallet 33 of apparatus 30.

Figure 4:
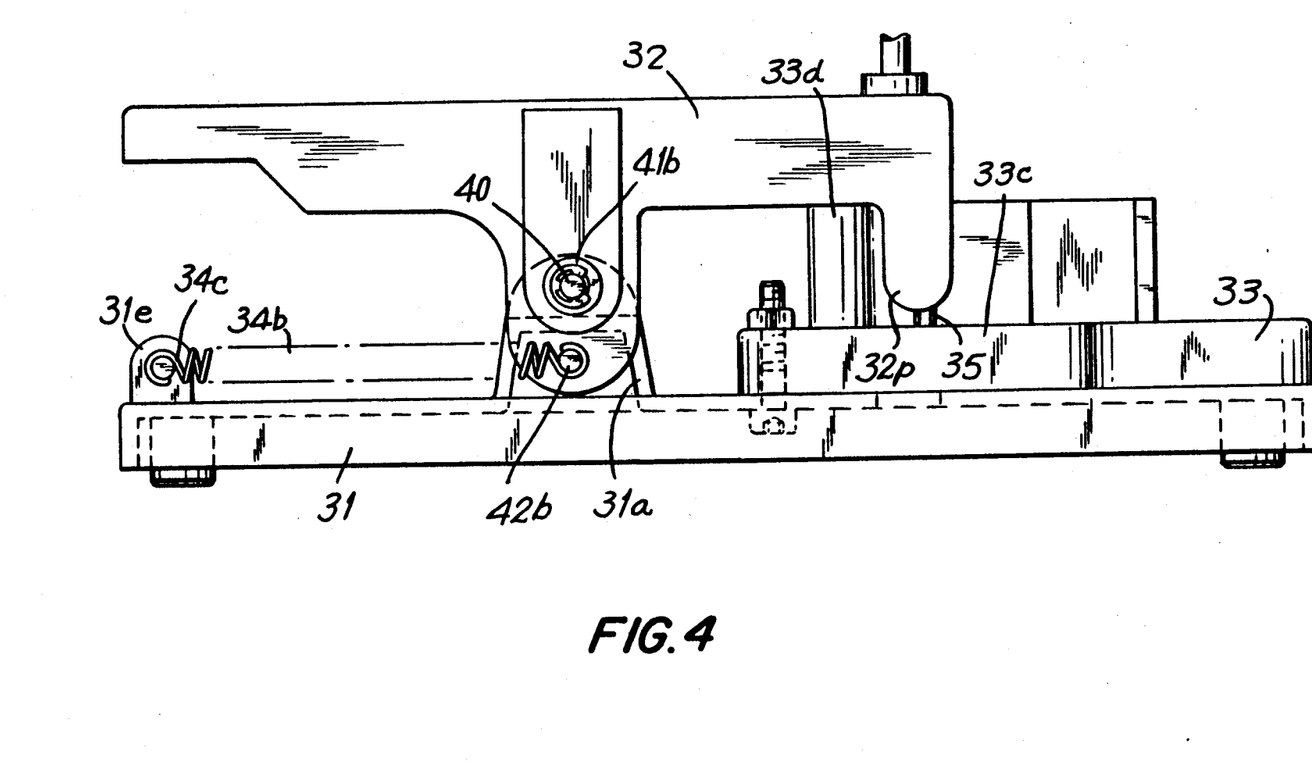
FIG. 4 is a front elevational view of the apparatus shown in FIG. 3.

As shown in FIGS. 3 and 4 a pair of tensile coil springs 34a and 34b serve to bias a plurality of read/write terminals 35 extending downwardly from a distal end 32p of arm 32 toward a table base 33c of pallet 33. Base 31 includes a rotation bearing protrusion portion 31a integrally formed on base 31. A rotation limiting portion 33d limits the rotation of arm 32 toward pallet 33 by serving as a stop for arm 32. With arm 32 resting against rotation limiting portion 33d, terminals 35 are in position for reading information from or writing information into device 50.

Figure 5:
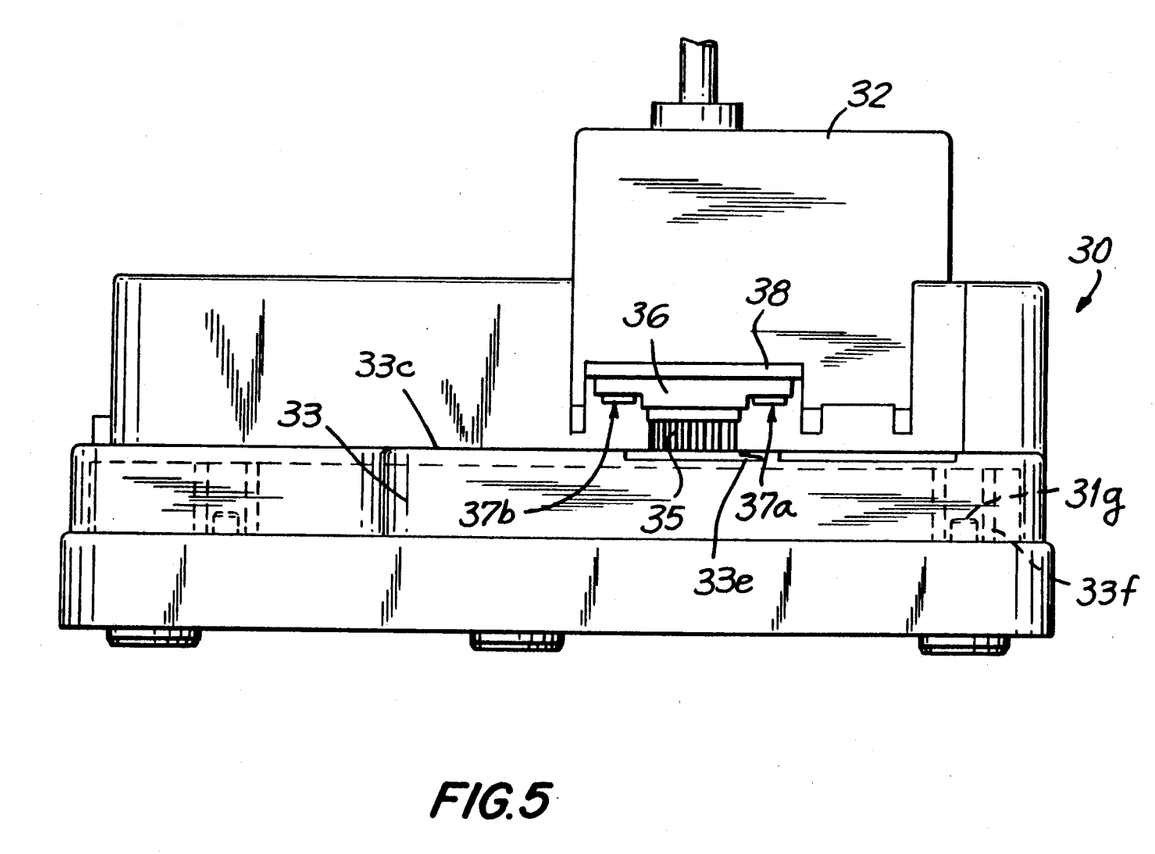
FIG. 5 is a right side elevational view of the apparatus shown in FIG. 3.

As shown in FIG. 5, which illustrates the right side elevational view of apparatus 30 shown in of FIG. 3, a holder 36 secures terminals 35 to arm 32. A pair of screws 37a and 37b, or other suitable fixing elements, secure holder 36 through a substrate 38 to arm 32. A flat recess 33e serves as a relief for terminals 35 and is formed in table face 33c of pallet 33.

Terminals 35 are spring bars which compensate for vertical positional error relative to table base 33c when terminals 35 are inserted through hole 1h of device 50 for making contact with terminals 20c of substrate 20. Preferably, the tips of terminals 35 are substantially spherical and gold plated to improve their durability and reliability in reading and writing of information.

Figure 6:
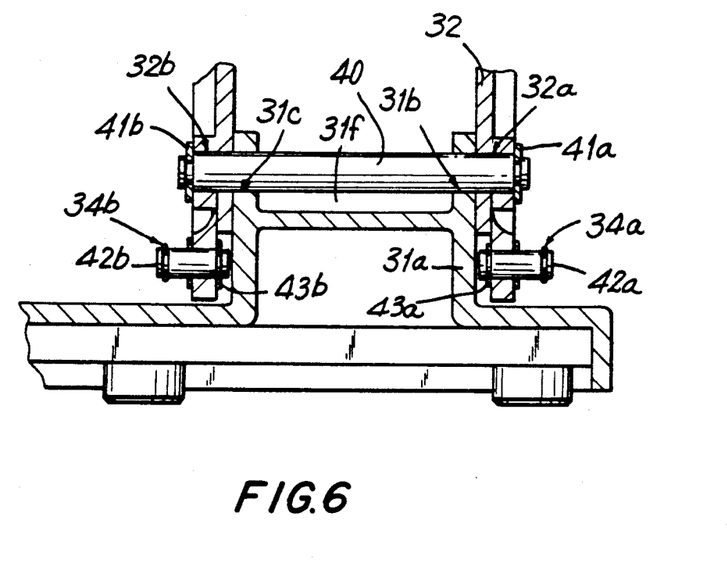
FIG. 6 is a fragmentary sectional view of the rotation bearing protrusion of the apparatus shown in FIG. 4.

FIG. 6 illustrates rotation bearing protrusion portion 31a. A rotary shaft 40 rotatably extends through a pair of horizontal holes 31b and 31c of rotation bearing protrusion portion 31a. Arm 32 also includes a pair of horizontal holes 32a and 32b located along the side edges of arm 32. Rotation bearing protrusion portion 31a is rotatably supported by rotary shaft 40 and thereby permits arm 30 to pivot towards and away from pallet 33 about rotary shaft 40. A pair of E-shaped retaining rings 41a and 41b seated in a pair of grooves formed at both ends of rotary shaft 40 prevent rotary shaft 40 from slipping out from holes 31b and 31c.

A pair of retaining members 42a and 42b serve to catch and hold the pair of hook portions 34c and 34d of tensile coil spring 34a and 34b, respectively. A pair of E-shaped retaining rings 43a and 43b prevent retaining members 42a and 42b and arm 32 from becoming dislodged from apparatus 30. A pair of retaining members 44a and 44b, shown in FIG. 3, are identical to retaining members 42a and 42b. A pair of E-shaped retaining rings (not shown) for preventing retaining members 44a and 44b from coming off protrusions 31d and 31e of base 31 are identical to the E-shaped retaining rings 41a, 41b, 43a and 43b shown in FIG. 6. By standardizing the shape of the retaining rings, the number of different types of parts and manufacturing costs of apparatus 30 can be decreased.

A flat recess 31f shown in FIG. 6, is formed in an upper portion of rotation bearing protrusion portion 31a for decreasing the contact area of rotary shaft 40 with rotation bearing protrusion portion 31a. By providing flat recess 31f, machining of rotation bearing protrusion portion 31a is simplified. Furthermore, by providing flat recess 31f in rotation bearing protrusion portion 31a, variations in the turning force required to rotate arm 32 are reduced.

Figure 7:
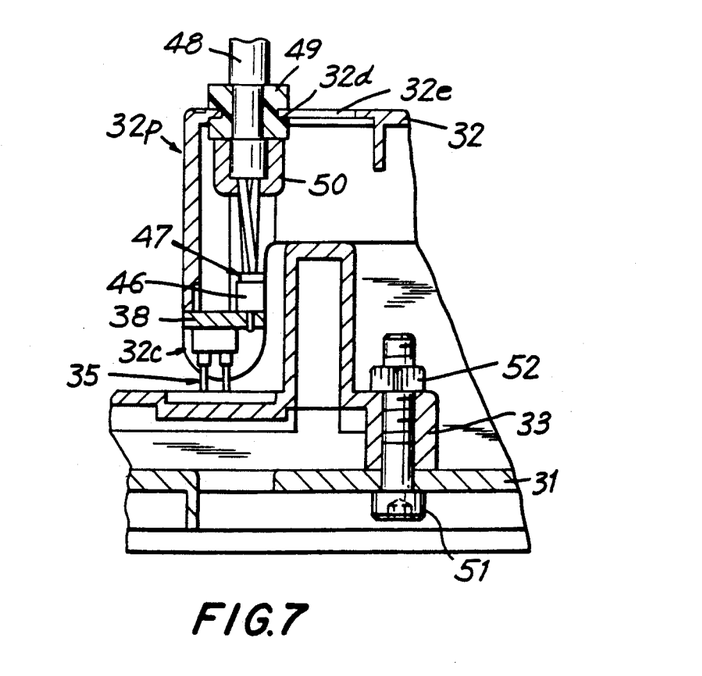
FIG. 7 is a fragmentary sectional view of the arm of the apparatus shown in FIG. 3.

Referring now to FIG. 7, distal end 32p of arm 32 includes a guide portion 32c formed integrally with arm 32 and is similar in function to a battery receiving portion of battery casing 1 shown in FIG. 1. Since receiver 50 is basically positioned and guided by guide portion 32c, receiver 50 can be readily mounted on pallet 33. Undesirable interference between terminal 35 and receiver 50 is thereby minimized. A socket 46 is soldered to substrate 38. A housing 47 is detachably secured to socket 46. A cable 48 is detachably secured by a bushing 49 to a slit portion 32d of arm 32. A sealing member 50 prevents cable 48 from coming off bushing 49. Preferably, bushing 49 is made from a non-migratable elastic material to prevent cable 48 and arm 32 from discoloring and deteriorating. A hexagonal socket head cap screw 51 extends through pallet 33 and is secured by a hexagonal nut 52 for connecting pallet 33 to base 31. Screw 51 is spaced slightly away from pallet 33 and base 31. A notched portion 32e of arm 32 receives and holds bushing 49. Notch portion 32e has a shape substantially identical to the outer shape of bushing 49 as shown in FIG. 3.

Figure 8:
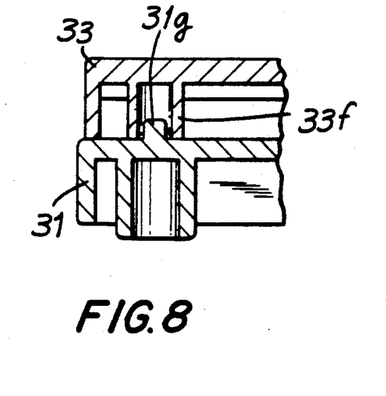
FIG. 8 is a fragmentary sectional view of a guide protrusion of the apparatus shown in FIG. 3.

As shown in FIG. 8, a guide protrusion portion 31g (also shown in FIG. 3) is guided by a guide protrusion 33f of pallet 33. Guide protrusion 33f is formed integrally with pallet 33. A slight gap between guide protrusion 33f and guide protrusion portion 31g exits to permit positional adjustment between terminal 35 and receiver 50. The combination of guide protrusion 31g and guide protrusion 31f is provided at the upper and lower right hand corners of pallet 33 as shown in FIG. 3. Accordingly, pallet 33 can be easily and readily placed on base 31.

Figure 9:
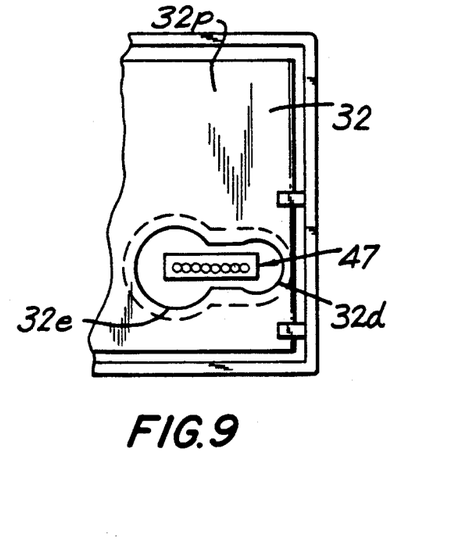
FIG. 9 is a fragmentary plan view of a housing of the apparatus shown in FIG. 3.

FIG. 9 illustrates distal end portion 32p of arm 32 in which housing 47 is inserted inside slit portion 32d and notch portion 32e. Once housing 47 has been pushed beyond slit portion 32d and notch portion 32e, bushing 49 is inserted in notch portion 32e and secured in split portion 32d. Since bushing 49 and slit portion 32d are dimensioned so that bushing 49 frictionally engages split portion 32d, bushing 49 is securely held by split portion 32d and does not move about during operation of apparatus 30.

Figure 10:
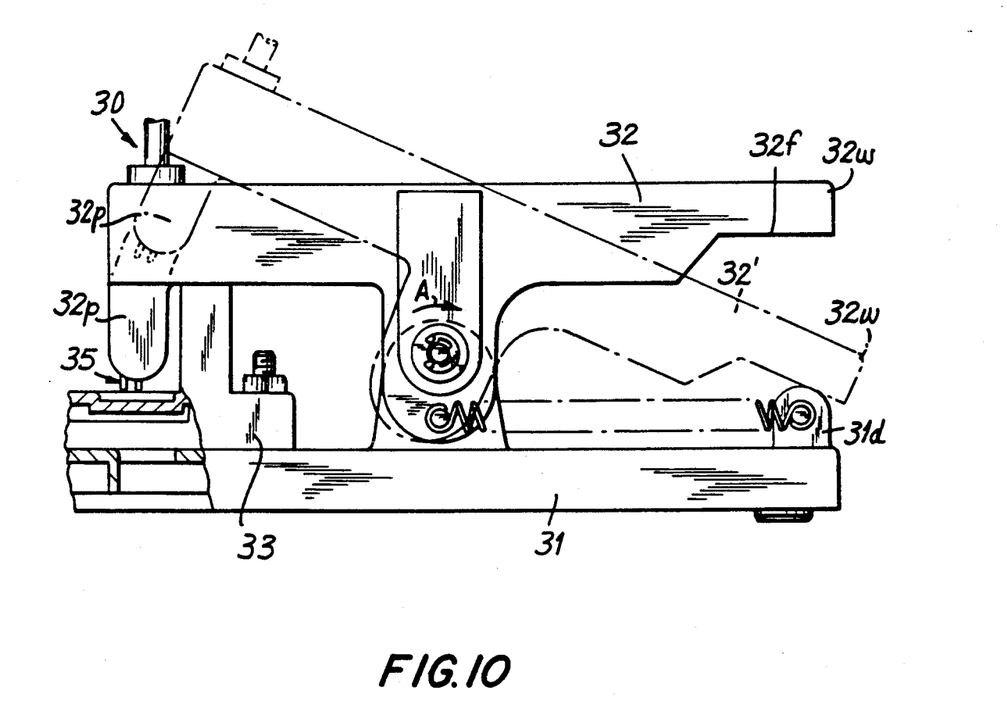
FIG. 10 is a fragmentary side elevational view, partially in cross-section, of the apparatus shown in FIG. 3.

As shown in FIG. 10, by depressing a rear end 32w of arm 32, illustrated as a dot-dash line 32′, distal end 32p is rotated away from pallet 33 in a direction denoted by an arrow A. In rotating arm 32, a notch 32f contacts a protrusion 31d of base 31. Notch 32f is formed on the lower side of rear end 32w. Protrusion 31d is integrally formed on base 31 and serves as a stop to limit the rotational position of arm 32 as rear end 32w is depressed. When notch 32f is in contact with protrusion 31d, distal end 32p of arm 32 is at its maximum distance from pallet 33.

Figure 11:
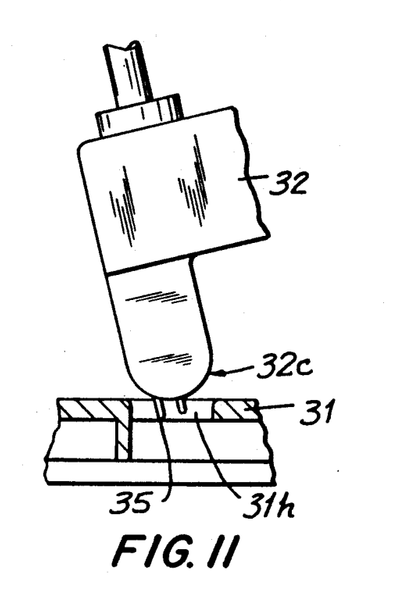
FIG. 11 is a fragmentary side elevational view of the arm of the apparatus shown in FIG. 3.

As shown in FIG. 11, when arm 32 is permitted to rotate toward base 31 with pallet 33 removed from apparatus 30, terminal 35 extends into a flat recess 31h. Flat recess 31h serves as a relief for terminal 35. Typically, flat recess 31h is a simple opening extending through base 31. Excessive rotation of arm 32 is prevented by guide portion 32c of arm 32 coming into contact with the edge of flat recess 31h, which is formed in the upper face of base 31. Consequently, no pressure is exerted on terminal 35 when pallet 33 is removed.

Figure 12:
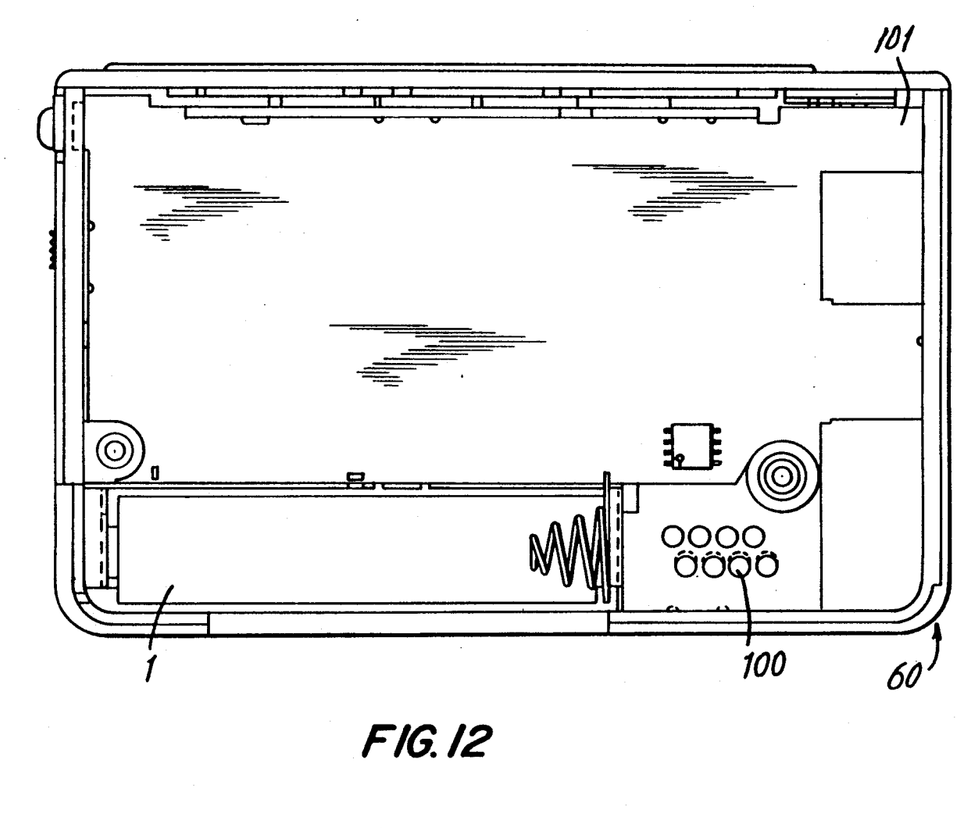
FIG. 12 is a plan view of an identification code read/write device in accordance of another embodiment of the invention.

FIG. 12 illustrates a receiver 60 in accordance with an alternative embodiment of the invention and is substantially similar to device 50 except as noted below. Receiver 60 includes a plurality of terminals 100 provided on a circuit substrate 101. Terminals 100 are positioned at the side of battery casing 1. A terminal protective cover (not shown) is integrally formed with the battery cover (not shown) and overlies terminals 100 when in position. To prevent short circuiting during replacement of a battery, it is preferable to provide a short circuiting preventive member between terminals 100 and a battery cover (not shown). Such a short circuiting preventative member is integrally formed with the battery casing 1. Terminals 100 can be located at other positions of circuit substrate 101 or on a equivalent substrate member. When the terminal protective casing is provided independently of battery color, however, a relatively complicated structure for receiver 60 is required, access to terminals 100 is more difficult and receiver 60 may be relatively weak in withstanding a charge of static electricity.

The method for reading from and writing into storage element 21 of device 50 information such as an identification code using apparatus 30 is as follows. Initially rear end 32w of arm 32 is depressed toward protrusion 31d of base 31 to separate (i.e., detach) terminals 35 from pallet 33 as shown in FIG. 10. Sides 2e and 2f of front casing cover (i.e., out of casing) 2 of receiver 50 are positioned so as to come into contact with walls 33b and 33a of pallet 33, respectively. Walls 33a and 33b both guide and properly position receiver 50 on pallet 33. When rear end 32w is no longer depressed, terminals 35 rotate towards and come into contact with terminals 20c of substrate 20 by extending through holes 1h. The biasing force required to press terminals 35 against terminals 20c is provided by coil springs 34a and 34b shown in FIG. 3.

As now can be readily appreciated, an identification code read/write device in accordance with the invention permits ready access of terminals 20c of substrate 20 of receiver 50 by inserting terminals 35 of apparatus 30 through a plurality of openings 1h. Terminals 35 are inserted substantially in a direction orthogonal to openings 1h with the terminal protective cover of receiver 50 removed. Since terminals 20c are arranged on substrate 20 so as to lie in a plane which is substantially parallel to a battery case opening 26a (see FIG. 2) with the terminal protective cover (i.e. battery cover 26) removed, holes 1h (which lead to the inner circuitry) can be readily closed to prevent dust and the like from reaching terminals 20c. The need for additional spacing to accommodate guide slits as required by conventional apparatuses is eliminated. Accordingly, the packaging density of device 50 can be increased while providing a device which is relatively small in size and light in weight.

An identification code read/write device in accordance with the invention has a guide portion for guiding the outer casing of the device in at least two directions of a plane with read/write terminal 35 of apparatus 30 being detachably supported relative to terminals 20c of substrate 20. Access to read/write terminals 20c by read/write terminals 35 can be achieved through a simple, single operation. Read/write terminals 35 are sufficiently strong, do not require a complicated design and have a relatively high durability. Apparatus 30 is a relatively simple structure, light in weight, small in size and has a low manufacturing cost.

In reading from and writing into device 50, read/write terminals 35 are spaced pallet 33 until device 50 is initially positioned on pallet 33. Device 50 is easily and properly positioned on pallet 33 by having sides 2e and 2f of front casing cover 2 brought into contact with walls 33b and 33a for guiding the former. Read/write terminals 35 are then brought into contact with read/write terminals 20c of substrate 20. Operation of read/write apparatus 30 can be easily controlled by an operator.

It will thus be seen that the objects set forth above and those made apparent from the preceding description are efficiently attained and, since certain changes have been made in the above method and construction set forth without departing from the spirit and scope of the invention, it is intended that all matter contained in the above-description and shown in the accompanying drawings shall be interpreted as illustrative and not in any limiting sense.

It is also to be understood that the following claims are intended to cover all the generic and specific features of the invention therein described and all statements of the scope of the invention, which as a matter of language, might said to fall therebetween.

What is claimed is:

1. A device for receiving or transmitting information or for receiving and transmitting information, comprising
   a device housing having a plurality of walls;
   a battery housing within said device housing and including an exterior side portion and an exterior bottom portion, said exterior bottom portion having at least one opening therethrough, said exterior bottom portion of said battery housing being spaced from and facing a first wall of said device housing and said exterior side portion of said battery housing being spaced from a second wall of said device housing to define at least one compartment therebetween;
   a circuit substrate formed of a flexible material, having a first end including terminal means through which at least a portion of said information can be written into said device, said first end of said circuit substrate including said terminal means disposed in the space between said exterior bottom portion and said first wall of said device housing, said terminal means including at least one terminal arranged on said flexible circuit substrate for positioning opposed to said at least one opening; and
   an additional circuit substrate disposed in said compartment and electrically coupled to a second end of said first circuit substrate.

2. The device of claim 1, wherein said device further includes a protective cover positioned above said opening so that upon removal of said protective cover from said device said opening is exposed.

3. The device of claim 2, wherein said additional circuit substrate extends substantially parallel to said exterior bottom portion of the battery housing.

4. The device of claim 2, wherein the device includes a storage means electrically connected to said flexible circuit substrate.

5. The device of claim 4, wherein the storage means is an EEPROM.

6. The device of claim 2, wherein the flexible circuit substrate includes electrical circuitry on only one side of the flexible circuit substrate.

7. The device of claim 2, wherein said protective cover is a cover for said battery housing.

8. The device of claim 7, wherein said device includes storage means for storing at least said portion of said information.

9. The device of claim 8, wherein said portion of said information includes an identification code.

10. The device of claim 9, wherein said flexible circuit substrate includes a plurality of terminals, said battery housing including a plurality of said openings corresponding to and positioned directly above said terminals.

11. The device of claim 10, wherein said openings and terminals lie in substantially parallel planes.

12. The device of claim 7, wherein said flexible circuit substrate includes a plurality of terminals, said battery housing including a plurality of said openings corresponding to and positioned directly above said terminals.

13. The device of claim 12, wherein said openings and terminals lie in substantially parallel planes.

14. The device of claim 1, wherein said device includes storage means for storing at least said portion of said information.

15. The device of claim 14, wherein said portion of said information includes an identification code.

16. The device of claim 14, wherein said additional circuit substrate extends substantially parallel to said exterior bottom portion of the battery housing.

17. The device of claim 16, wherein the circuit substrate includes electrical circuitry on only one side of the circuit substrate.

18. The device of claim 14, wherein the storage means is an EEPROM.

19. The device of claim 14, wherein the flexible circuit substrate includes electrical circuitry on only one side of the flexible circuit substrate.

20. The device of claim 1, wherein said flexible circuit substrate includes a plurality of terminals, said battery housing including a plurality of said openings corresponding to and positioned directly above said terminals.

21. The device of claim 20, wherein said openings and terminals lie in substantially parallel planes.

22. The device of claim 20, wherein said additional circuit substrate extends substantially parallel to said bottom exterior portion of said battery housing.

23. The device of claim 22, wherein said flexible circuit substrate crosses over said additional flexible circuit substrate at an angle of approximately 90°.

24. The device of claim 23, wherein said flexible circuit substrate crosses over said additional circuit substrate in the compartment defined by said exterior side portion of the battery housing.

25. The device of claim 20, wherein the device includes a storage means electrically connected to said flexible circuit substrate.

26. The device of claim 1, wherein the flexible circuit substrate is bent so as to be positioned adjacent both the exterior side portion and exterior bottom portion of the battery housing.

27. The device of claim 26, wherein the flexible circuit substrate includes electrical circuitry on only one side of the flexible circuit substrate.

28. The device of claim 1, wherein said additional circuit substrate extends substantially parallel to said exterior bottom portion of the battery housing.

29. The device of claim 28, wherein the circuit substrate includes electrical circuitry on only one side of the circuit substrate.

30. The device of claim 1, wherein said flexible circuit substrate crosses over said additional circuit substrate at an angle of approximately 90°.

31. The device of claim 30, wherein said flexible circuit substrate crosses over said additional circuit substrate in the compartment defined by the exterior side portion of the battery housing.

32. The device of claim 30, wherein the flexible circuit substrate includes electrical circuitry on only one side of the flexible circuit substrate.

33. The device of claim 1, wherein the device includes a storage means electrically connected to said flexible circuit substrate.

34. The device of claim 33, wherein the storage means is an EEPROM.

35. The device of claim 33, wherein the flexible circuit substrate includes electrical circuitry on only one side of the flexible circuit substrate.

36. The device of claim 1, wherein the flexible circuit substrate includes electrical circuitry on only one side of the flexible circuit substrate.

37. The device of claim 1, wherein said exterior bottom portion of said battery housing and the opposed wall of the device housing are closely spaced.

38. An apparatus for writing information into and reading information from a device, said device having a housing having a pair of side walls, said apparatus comprising:
base means for receiving and supporting said device and having guide means extending in at least two directions in the same plane for positioning said device on said apparatus by placing said side walls of said device against said guide means;
read/write terminal means for reading information from and writing information into said device; and
connection means mounted in said base means for selectively positioning said read/write terminal means related to said base means, so that said read/write terminal means is movable towards and away from said base means so as to engage and be disengaged from a predetermined location in said device when said device is positioned on said base means by said guide means.

39. The apparatus of claim 38, wherein said guide means include a pair of walls extending substantially orthogonally to each other.

40. The apparatus of claim 39, wherein said base means include a detachable pallet on which said device is received and supported, said guide means connected to and rising above said table.

41. The apparatus of claim 40, wherein said guide means are integrally formed on said pallet.

42. The apparatus of claim 41, wherein said connection means include arm means for adjusting the position of said read/write terminal means relative to said base means.

43. The apparatus of claim 42, wherein said base means include a detachable pallet on which said device is received and supported, said guide means connected to and rising above said pallet.

44. The apparatus of claim 40, wherein said connection means include arm means for adjusting the position of said read/write terminal means relative to said base means.

45. The apparatus of claim 44, wherein said base means include a detachable pallet on which said device is received and supported, said guide means connected to and rising above said pallet.

46. The apparatus of claim 39, wherein said connection means include arm means for adjusting the position of said read/write terminal means relative to said base means.

47. The apparatus of claim 46, wherein arm means includes at least one end, said read/write terminal means connected to said end.

48. The apparatus of claim 39, wherein said device includes a circuit substrate having at least two terminals which are arranged on the circuit substrate in a first plane; and wherein said read/write terminal means includes a plurality of terminals corresponding in number to said terminals of said circuit substrate and having ends forming a plane substantially parallel to said first plane, said ends operable for engaging and being disengaged from said terminals of said circuit substrate.

49. The apparatus of claim 48, wherein said device is enclosed in a housing having an opening which extends in a plane substantially parallel to said first plane and positioned above said terminals of said substrate; and wherein said device further includes a battery casing, said opening serving as an opening for said battery casing, said battery casing including a plurality of apertures corresponding to and positioned directly above said terminals; and wherein said read/write terminal means of said apparatus are operable for passing through said opening and said apertures for engaging and being disengaged from said terminals of said device.

50. The apparatus of claim 38, wherein said base means include a detachable pallet on which said device is received and supported, said guide means connected to and rising above said table.

51. The apparatus of claim 50, wherein said guide means are integrally formed on said pallet.

52. The apparatus of claim 51, wherein said device includes a circuit substrate having at least two terminals which are arranged on the circuit substrate in a first plane; and wherein said read/write terminal means includes a plurality of terminals corresponding in number to said terminals of said circuit substrate and having ends forming a plane substantially parallel to said first plane, said ends operable for engaging and being disengaged from said terminals of said circuit substrate.

53. The apparatus of claim 52, wherein said device is enclosed in a housing having an opening which extends in a plane substantially parallel to said first plane and positioned above said terminals of said substrate; and wherein said device further includes a battery casing, said opening serving as an opening for said battery casing, said battery casing including a plurality of apertures corresponding to and positioned directly above said terminals; and wherein said read/write terminal means of said apparatus are operable for passing through said opening and said apertures for engaging and being disengaged from said terminals of said device.

54. The apparatus of claim 50, wherein said connection means include arm means for adjusting the position of said read/write terminal means relative to said base means.

55. The apparatus of claim 54, wherein arm means includes at least one end, said read/write terminal means connected to said end.

56. The apparatus of claim 50, wherein said device includes a circuit substrate having at least two terminals which are arranged on the circuit substrate in a first plane; and wherein said read/write terminal means includes a plurality of terminals corresponding in number to said terminals of said circuit substrate and having ends forming a plane substantially parallel to said first plane, said ends operable for engaging and being disengaged from said terminals of said circuit substrate.

57. The apparatus of claim 56, wherein said device is enclosed in a housing having an opening which extends in a plane substantially parallel to said first plane and positioned above said terminals of said substrate; and wherein said device further includes a battery casing, said opening serving as an opening for said battery casing, said battery casing including a plurality of apertures corresponding to and positioned directly above said terminals; and wherein said read/write terminal means of said apparatus are operable for passing through said opening and said apertures for engaging and being disengaged from said terminals of said device.

58. The apparatus of claim 38, wherein said connection means include arm means for adjusting the position of said read/write terminal means relative to said base means.

59. The apparatus of claim 58, wherein arm means includes at least one end, said read/write terminal means connected to said end.

60. The apparatus of claim 59, wherein said device includes a circuit substrate having at least two terminals which are arranged on the circuit substrate in a first plane; and wherein said read/write terminal means includes a plurality of terminals corresponding in number to said terminals of said circuit substrate and having ends forming a plane substantially parallel to said first plane, said ends operable for engaging and being disengaged from said terminals of said circuit substrate.

61. The apparatus of claim 60, wherein said device is enclosed in a housing having an opening which extends in a plane substantially parallel to said first plane and positioned above said terminals of said substrate; and wherein said device further includes a battery casing, said opening serving as an opening for said battery casing, said battery casing including a plurality of apertures corresponding to and positioned directly above said terminals; and wherein said read/write terminal means of said apparatus are operable for passing through said opening and said apertures for engaging and being disengaged from said terminals of said device.

62. The apparatus of claim 58, wherein said device includes a circuit substrate having at least two terminals which are arranged on the circuit substrate in a first plane; and wherein said read/write terminal means includes a plurality of terminals corresponding in number to said terminals of said circuit substrate and having ends forming a plane substantially parallel to said first plane, said ends operable for engaging and being disengaged from said terminals of said circuit substrate.

63. The apparatus of claim 62, wherein said device is enclosed in a housing having an opening which extends in a plane substantially parallel to said first plane and positioned above said terminals of said substrate; and wherein said device further includes a battery casing, said opening serving as an opening for said battery casing, said battery casing including a plurality of apertures corresponding to and positioned directly above said terminals; and wherein said read/write terminal means of said apparatus are operable for passing through said opening and said apertures for engaging and being disengaged from said terminals of said device.

64. The apparatus of claim 38, wherein said device includes a circuit substrate having at least two terminals which are arranged on the circuit substrate in a first plane; and wherein said read/write terminal means includes a plurality of terminals corresponding in number to said terminals of said circuit substrate and having ends forming a plane substantially parallel to said first plane, said ends operable for engaging and being disengaged from said terminals of said circuit substrate.

65. The apparatus of claim 64, wherein said device is enclosed in a housing having an opening which extends in a plane substantially parallel to said first plane and positioned above said terminals of said substrate; and wherein said device further includes a battery casing, said opening serving as an opening for said battery casing, said battery casing including a plurality of apertures corresponding to and positioned directly above said terminals; and wherein said read/write terminal means of said apparatus are operable for passing through said opening and said apertures for engaging and being disengaged from said terminals of said device.

66. The device of claim 65, wherein said additional circuit substrate extends substantially parallel to said exterior bottom portion of said battery housing.

67. The device of claim 66, wherein said flexible circuit substrate crosses over said additional circuit substrate at an angle of approximately 90°.

68. The device of claim 67, wherein said flexible circuit substrate crosses over said additional circuit substrate on the exterior side surface of the battery housing.

69. The device of claim 66, wherein said flexible circuit substrate crosses over said additional circuit substrate on the exterior side surface of the batter housing.

70. The device of claim 65, wherein the device includes a storage means electrically connected to said flexible circuit substrate.

71. The device of claim 70, wherein said storage means is an EEPROM.

72. A method for reading information from and writing information into a device by an apparatus, said device being enclosed within a housing having a pair of side walls and a circuit substrate with terminals arranged in a first plane, said method comprising the steps of:

moving a rotatable arm of said apparatus away from a base of the apparatus, said apparatus also including a pair of guide walls positioned substantially orthogonal to each other on said base wherein said arm has a plurality of read/write terminals arranged so as to form a plane substantially parallel to said first plane when in an operative position;

positioning said device on said base of said apparatus by placing said side walls of said device against said guide walls of said base; and moving said rotatable arm toward said base to said operable position whereby said read/write terminals engage said terminals of said circuit substrate.

73. The method of claim 72, wherein said device includes a battery casing having a plurality of apertures corresponding to and positioned directly above the terminals of said substrate and forming a plane substantially parallel to said first plane; and further including the step of inserting said read/write terminals through said plurality of apertures to engage said terminals of said circuit substrate.

* * * * *